(12) United States Patent
Liu

(10) Patent No.: US 12,479,233 B2
(45) Date of Patent: Nov. 25, 2025

(54) INTEGRALLY FORMED CARBON FIBER SPOKE AND MANUFACTURING METHOD THEREOF

(71) Applicant: Xiamen Carbonwing Composite Technology Co., Ltd., Fujian (CN)

(72) Inventor: Wurui Liu, Fujian (CN)

(73) Assignee: Xiamen Carbonwing Composite Technology Co., Ltd., Fujian (CN)

( * ) Notice: Subject to any disclaimer, the term of this patent is extended or adjusted under 35 U.S.C. 154(b) by 203 days.

(21) Appl. No.: 18/044,265

(22) PCT Filed: Mar. 18, 2022

(86) PCT No.: PCT/CN2022/081744
§ 371 (c)(1),
(2) Date: Mar. 7, 2023

(87) PCT Pub. No.: WO2022/199490
PCT Pub. Date: Sep. 29, 2022

(65) Prior Publication Data
US 2023/0322017 A1 Oct. 12, 2023

(30) Foreign Application Priority Data

Mar. 23, 2021 (CN) .......................... 202110307239.3
Mar. 23, 2021 (CN) .......................... 202110307305.7

(51) Int. Cl.
*B60B 5/02* (2006.01)
*B60B 1/02* (2006.01)
*B60B 1/04* (2006.01)

(52) U.S. Cl.
CPC .............. *B60B 5/02* (2013.01); *B60B 1/0261* (2013.01); *B60B 1/041* (2013.01); *B60B 1/045* (2013.01);
(Continued)

(58) Field of Classification Search
CPC B60B 1/003; B60B 1/04; B60B 1/041; B60B 1/042; B60B 1/043; B60B 1/044; B60B 1/045; B60B 1/0261; B60B 5/02
See application file for complete search history.

(56) References Cited

U.S. PATENT DOCUMENTS 4,729,605 A * 3/1988 Imao ...................... B60B 1/003
301/58
5,350,221 A * 9/1994 Pearce ................... B60B 1/003
301/58
(Continued)

FOREIGN PATENT DOCUMENTS

CN 205273028 U * 6/2016
CN 107471903 A 12/2017
(Continued)

OTHER PUBLICATIONS

International Search Report cited in PCT/CN2022/081744 mailed Jun. 22, 2022, 8 pages.
(Continued)

*Primary Examiner* — Kip T Kotter
(74) *Attorney, Agent, or Firm* — Cooper Legal Group, LLC

(57) ABSTRACT

The present disclosure provides an integrally formed carbon fiber spoke and a manufacturing method thereof. The method includes manufacturing a carbon fiber core body and a first metal part and a second metal part at two ends; winding or wrapping the carbon fiber core body and the metal parts at the two ends with carbon fiber prepregs to form a semi-finished product; and putting the wound or wrapped semi-finished product into a forming mold for heat forming. In the present disclosure, the metal parts are wound or wrapped with the carbon fiber prepregs, such that sandwich structures are formed between the metal parts and
(Continued)

carbon fiber materials to expand a bonding force of bonding interfaces.

12 Claims, 18 Drawing Sheets

(52) U.S. Cl.
 CPC ..... *B60B 2310/204* (2013.01); *B60B 2360/10* (2013.01); *B60B 2360/1442* (2013.01); *B60B 2360/3416* (2013.01)

(56) References Cited

U.S. PATENT DOCUMENTS

| | | | | |
|---|---|---|---|---|
| 6,036,281 | A | * | 3/2000 | Campbell ................. B60B 5/02 |
| | | | | 301/58 |
| 7,988,240 | B2 | * | 8/2011 | Lubecki ................... B60B 9/26 |
| | | | | 301/59 |
| 8,985,708 | B2 | * | 3/2015 | Connolly ................ B60B 1/042 |
| | | | | 301/58 |
| 10,808,799 | B2 | * | 10/2020 | Campbell ......... B29C 45/14385 |
| 2010/0301662 | A1 | * | 12/2010 | Schlanger ............. B60B 21/062 |
| | | | | 301/58 |
| 2017/0129278 | A1 | * | 5/2017 | Schlanger ............... B60B 31/02 |
| 2018/0022147 | A1 | * | 1/2018 | Tien ........................ B60B 1/006 |
| | | | | 301/104 |
| 2020/0376887 | A1 | * | 12/2020 | Wang ..................... B60B 1/046 |

FOREIGN PATENT DOCUMENTS

| | | | | |
|---|---|---|---|---|
| CN | 107972403 | A | * 5/2018 | ............. B60B 1/044 |
| CN | 108790586 | A | * 11/2018 | ............... B60B 1/04 |
| CN | 109795257 | A | * 5/2019 | |
| CN | 110802982 | A | * 2/2020 | ............... B60B 1/02 |
| CN | 112092532 | A | * 12/2020 | ............. B29C 70/42 |
| CN | 112829509 | A | 5/2021 | |
| CN | 112959855 | A | 6/2021 | |
| EP | 1559581 | A1 | 8/2005 | |
| WO | WO-03020535 | A2 | * 3/2003 | ............. B60B 1/003 |
| WO | 2008113487 | A1 | 9/2008 | |

OTHER PUBLICATIONS

Written Opinion cited in PCT/CN2022/081744 mailed Jun. 22, 2022, 4 pages.

\* cited by examiner

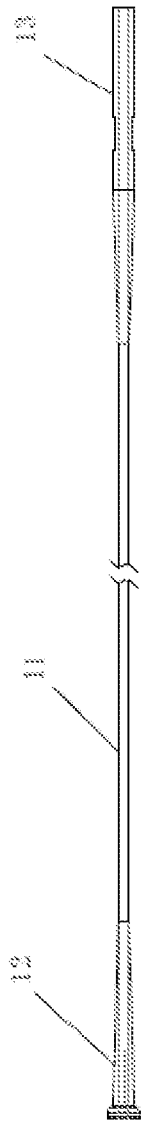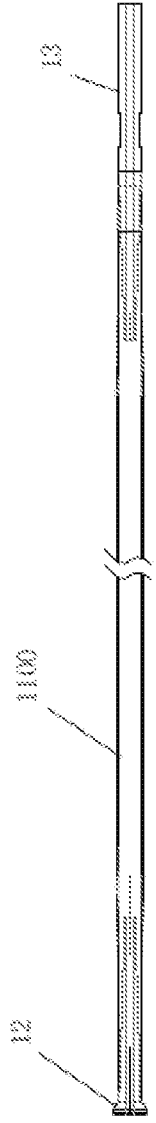
FIG. 8
FIG. 9

INTEGRALLY FORMED CARBON FIBER SPOKE AND MANUFACTURING METHOD THEREOF

TECHNICAL FIELD

The present disclosure provides an integrally formed carbon fiber spoke and a manufacturing method thereof, and belongs to the technical field of wheel spoke manufacturing according to the International Patent Classification (IPC).

BACKGROUND

In a bicycle race, bicycle equipment is a very important factor that affects the performance of athletes. The weight, rigidity, strength and geometric shape of a bicycle part are the most important factors that affect the speed. The lighter the weight is, the higher the speed is. The better the rigidity is, the more effective the energy conversion is.

In a bicycle system, a spoke is a bridge for connecting a rim to a hub. During use, one end of the spoke is provided with a cap head and is connected to the hub, and the other end of the spoke is provided with a screw tooth and is locked to a spoke cap and connected to a rim. During running of a bicycle, all bearing pressures are provided by a tension generated by assembling the spoke on the hub and the rim, so the performance of the spoke directly affects the performance of the whole bicycle. An existing spoke is generally made of stainless steel, titanium, aluminum and other materials, so it is quite heavy, which is disadvantageous to the increasing demand for light weight of products.

Compared with the stainless steel, aluminum alloy and other materials, carbon fiber reinforced plastics (CFRP) have incomparable advantages in terms of weight. As a material of the spoke, the carbon fiber reinforced plastics are emerging in the market at present, but different factories have different production and manufacturing processes.

At present, in a mainstream method for manufacturing a carbon fiber spoke, a spoke body is formed by means of a mold or in other ways, and then metal parts are bonded at two ends of a spoke to achieve the function of the spoke. However, the strength of the spoke made in such way is affected by the stability of a bonding process. If the bonding area is smaller in design, the bonding strength is very unstable. If the bonding area is large, the size and weight of the metal parts used are increased: if the whole spoke is heavier, its final design significance is lost and it is not be recognized by the market; and when the size of the metal parts is larger, the hole diameters of a hub and a rim matched with the metal parts are increased, and the strength thereof is weakened under the same condition.

For example, a carbon fiber spoke is disclosed in the Chinese document CN205273028U, including a spoke body, where one end of the spoke body is connected to a first accessory capable of being cooperatively connected to a rim, the other end of the spoke body is connected to a second accessory capable of being cooperatively connected to a hub, and the spoke body is made from carbon fibers. The ends of the spoke body are connected to the accessories by means of bonding. During use, the hub and the rim can generate tension on the accessories, such that the accessories are easily pulled away from the spoke body to be separated from the spoke body, thereby causing short service life, insufficient safety, and increased maintenance costs.

For another example, in the Chinese document CN103448465A, a spoke fixing part for a carbon fiber rim of a bicycle includes a fixing portion and a butting portion, where the fixing portion is formed by extending axially along a virtual axis, the butting portion is formed at one end of the fixing portion and is formed by extending radially with the virtual axis as an axis, the spoke fixing part is provided with a positioning hole in a penetration manner, the positioning hole is sleeved on a spoke of the bicycle, the butting portion abuts against the carbon fiber rim of the bicycle, and when the spoke transmits a torsion to drive the carbon fiber rim, the spoke fixing part can fix the spoke, such that the spoke cannot move relative to the carbon fiber rim. The spoke for the bicycle is extremely complex in structure, inconvenient to manufacture and assembly, and high in manufacturing cost.

For another example, in the Chinese document CN107839402A, a basic structure of a carbon fiber wheel frame spoke includes a carbon fiber strip and a joint fixed to an end of the carbon fiber strip in a combined manner, where the joint is provided with a sleeve hole for the joint to be sleeved at the end of the carbon fiber strip; the carbon fiber wheel frame spoke is mainly characterized in that a diameter expansion section is arranged at the end of the carbon fiber strip, and a hole expansion section is cooperatively arranged at a corresponding position of the sleeve hole of the joint; and in this way, the diameter expansion section arranged at the end of the carbon fiber strip is nested in the hole expansion section arranged on the sleeve hole of the joint, such that a more solid and durable fixing and anti-falling effect is achieved between the carbon fiber strip and the joint. However, in such design, diameter expansion sections are arranged at two ends of the carbon fiber strip, such that basically two joints cannot be sleeved on the carbon fiber strip after the carbon fiber strip is made, so the solution is hardly operable. To say the least, even if the joints can be sleeved on the carbon fiber strip, the process and cost for forming cavities of supporting members in the diameter expansion sections on the thinner carbon fiber strip are very difficult and high. Therefore, this solution has high process requirements, complex mold making, low manufacturing efficiency, inconvenient assembly, and high manufacturing cost, and is basically not suitable for industrial production.

In addition, spokes on the market at present have large metal parts, and the whole spokes are heavier; and when the size of the metal parts is large, the hole diameters of hubs and rims matched with the metal parts are increased, and the strength of the hubs and the rims are weakened under the same condition.

SUMMARY

In view of the deficiencies in the prior art, the present disclosure provides an integrally formed carbon fiber spoke.

To achieve the above objective, the present disclosure adopts the following technical solution:

An integrally formed carbon fiber spoke, including a spoke inner core made from carbon fibers, a tooth cap capable of being cooperatively connected to a rim, a cap head capable of being cooperatively connected to a hub, and a carbon fiber prepreg layer, the tooth cap and the cap head being provided with through installation holes, the installation hole of the tooth cap and the installation hole of the cap head being respectively fixedly sleeved at two ends of the spoke inner core, the carbon fiber prepreg layer being arranged outside the spoke inner core, part of the metal tooth cap and part of cap head.

Further, the carbon fiber prepreg layer is formed by winding or wrapping the spoke inner core and the metal tooth cap and cap head with carbon fiber prepregs and heating in a mold.

Further, the spoke inner core is cylindrical, and joint parts at two ends of the spoke inner core are connected to the installation holes of the tooth cap and the cap head in a close-fit manner; and the joint parts of the spoke inner core are connected to the tooth cap or the cap head via adhesives.

Further, anti-falling bosses are arranged on the peripheries of the parts of the tooth cap and the cap head wrapped with the carbon fiber prepregs to increase a bonding force of the carbon fiber prepregs in wrapping; and a thread is formed in an end of the tooth cap, the tooth cap is provided with a nut for matched assembly to be connected and fixed to the rim, and a linear clamping groove is formed in a peripheral side of the tooth cap.

The present disclosure further provides a method for manufacturing the above integrally formed carbon fiber spoke.

A method for manufacturing an integrally formed carbon fiber spoke includes the following steps:
S1 manufacturing a carbon fiber core body, that is, a spoke inner core;
S2: manufacturing a first metal part and a second metal part at two ends of a spoke, and axially forming through holes in the centers of the two metal parts, the through holes being matched with the carbon fiber core body;
S3: enabling the carbon fiber core body to pass through the through holes of the first metal part and the second metal part, and arranging the first metal part and the second metal part at two ends of the carbon fiber core body;
S4: winding or wrapping the carbon fiber core body and the metal parts at the two ends with carbon fiber prepregs to form a semi-finished product;
S5: putting the wound semi-finished product into a forming mold for heat forming; and
S6: after forming, opening the mold to take out a formed product, and then processing a screw tooth on the second metal part to obtain a final usable product.

The present disclosure further provides an integrally formed carbon fiber spoke with butted inner cores. The solution is as follows:

An integrally formed carbon fiber spoke includes a spoke inner core made from carbon fibers, a tooth cap capable of being cooperatively connected to a rim, a cap head capable of being cooperatively connected to a hub, and a carbon fiber prepreg layer, where the tooth cap and the cap head are provided with through installation holes, the installation hole of the tooth cap and the installation hole of the cap head are respectively fixedly sleeved at two ends of the spoke inner core, the carbon fiber prepreg layer is arranged outside the spoke inner core and part of the metal tooth cap and cap head, the spoke inner core and the carbon fiber prepreg layer are integrally formed into a spoke body, the spoke inner core includes a first carbon rod inner core and a second carbon rod inner core, the first carbon rod inner core is butted with the second carbon rod inner core, and an outer end of the first carbon rod inner core and an outer end of the second carbon rod inner core are larger-diameter ends and are respectively sleeved with the cap head and the tooth cap.

Further, the carbon fiber prepreg layer is formed by winding the first carbon rod inner core, the second carbon rod inner core, the tooth cap, and the cap head with the carbon fiber prepregs and heating in the mold; and the outer ends of the first carbon rod inner core and the second carbon rod inner core are of an inverted cone structure, and a maximum end diameter D of the two carbon rod inner cores and a minimum end diameter d of the two carbon rod inner cores meet a condition that $2 \geq D/d \geq 1.3$.

Further, the installation hole is formed in the center of the cap head, the installation hole includes a tapered hole section and a straight hole section, and a maximum inner diameter of the tapered hole section is smaller than a maximum outer diameter of an inverted cone structure of the first carbon rod inner core; and the installation hole is formed in the center of the tooth cap, the installation hole includes a tapered hole section and a straight hole section, and a maximum inner diameter of the tapered hole section is smaller than a maximum outer diameter of an inverted cone structure of the second carbon rod inner core.

The above method for manufacturing an integrally formed carbon fiber spoke with butted inner cores includes the following steps:
S1 manufacturing carbon rod inner cores, where
the carbon rod inner cores include a first carbon rod inner core and a second carbon rod inner core, one ends of the two carbon rod inner cores are heads, the other ends of the two carbon rod inner cores are tails, the tails extend to the heads and are formed into cylinders, and the heads are formed into expanding parts with a gradually changed diameter;
S2: manufacturing a first metal part and a second metal part at two ends of a spoke, and axially forming through holes in the centers of the two metal parts, the through holes being matched with the first carbon rod inner core and the second carbon rod inner core;
S3: enabling the first metal part to be nested into the tail of the first carbon rod inner core and moving the first metal part in place, enabling the second metal part to be nested into the tail of the second carbon rod inner core and moving the second metal part in place, and enabling the tail of the first carbon rod inner core to be butted with the tail of the second carbon rod inner core, arranging the first metal part on the head of the first carbon rod inner core, and arranging the second metal part on the head of the second carbon rod inner core;
S4: winding or wrapping the first carbon rod inner core, the second carbon rod inner core, the first metal part, and the second metal part with carbon fiber prepregs to form a semi-finished product;
S5: putting the wound semi-finished product into a forming mold for heat forming; and
S6: after forming, opening the mold to take out a formed product, and then processing a screw tooth on the second metal part to obtain a final usable product.

In the integrated carbon fiber spoke and the manufacturing method thereof provided by the present disclosure, by means of the process for winding or wrapping the carbon fiber core body (that is the spoke inner core) and the metal parts with the carbon fiber prepregs, sandwich structures are formed between the metal parts and carbon fiber materials to expand bonding interfaces between the spoke body and the metal parts, namely, the tooth cap and the cap head at the two ends, thereby greatly increasing the bonding force between the spoke body and the metal parts at the two ends, ensuring that slip between the spoke body and the metal parts will not be caused, and improving the structural strength of the product.

In the integrated carbon fiber spoke with the butted inner cores and the manufacturing method thereof provided by the present disclosure, by means of the process for winding or wrapping two sections of the carbon rod (that is the spoke inner core) and the metal parts with the carbon fiber prepregs, the sandwich structures are formed between the metal parts and the carbon fiber materials to expand the bonding interfaces between the spoke body and the tooth cap and the cap head of the metal parts at the two ends, thereby greatly increasing the bonding force between the spoke body and the metal parts at the two ends; and meanwhile, the spoke inner core and the metal parts are bonded via the inverted cone structures, which ensures that the slip between the spoke body and the metal parts will not be caused, and improves the structural strength of the product.

BRIEF DESCRIPTION OF DRAWINGS

FIG. 8 is a schematic diagram of cooperation of the carbon fiber core body and the metal parts in the first embodiment of the present disclosure;

FIG. 9 is a schematic diagram after winding or wrapping by carbon fiber prepregs in the first embodiment of the present disclosure;

DESCRIPTION OF EMBODIMENTS

Figures 1, 2:
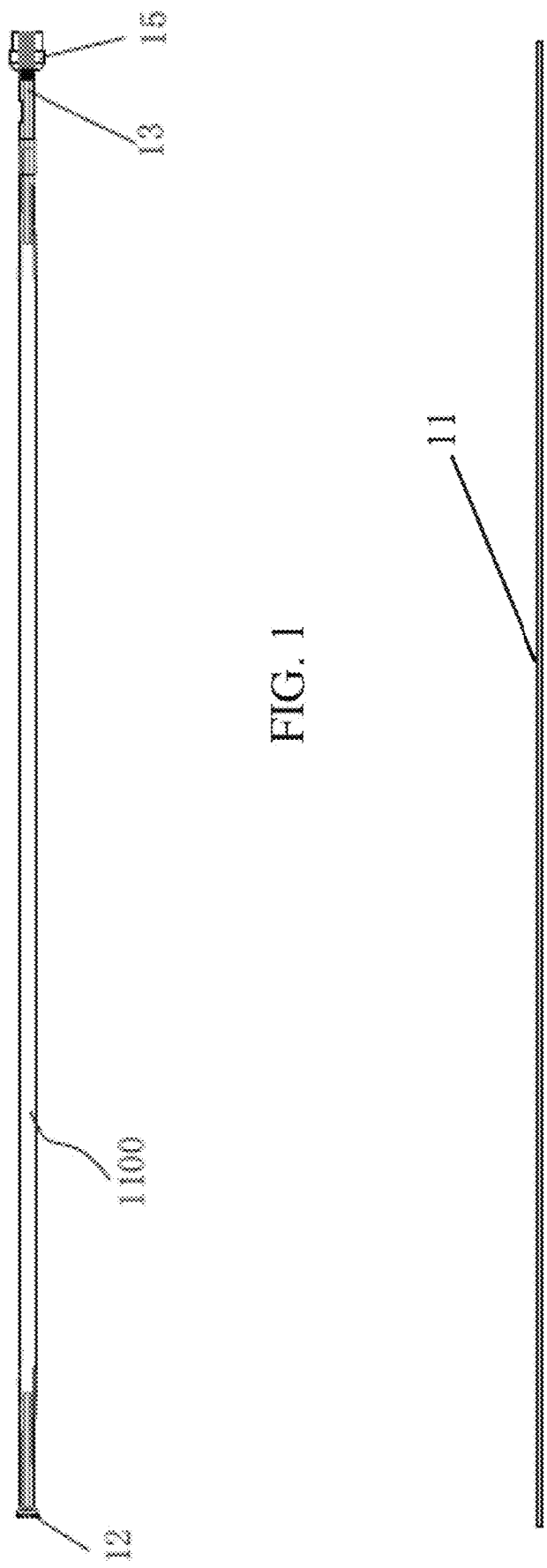
FIG. 1 is a schematic diagram of a first embodiment of the present disclosure.
FIG. 2 is a schematic diagram of a carbon fiber core body in the first embodiment of the present disclosure.

The present disclosure is further illustrated below in conjunction with the accompanying drawings:

Embodiment 1: referring to FIG. 1 to FIG. 16, an integrally formed carbon fiber spoke includes a spoke inner core, namely, a carbon fiber core body 11 made from carbon fibers, a second metal part 13, namely, a tooth cap capable of being cooperatively connected to a rim, a first metal part 12, namely, a cap head capable of being cooperatively connected to a hub, and a carbon fiber prepreg layer 14, where the tooth cap and the cap head are provided with through installation holes, the installation hole 131 of the tooth cap and the installation hole 121 of the cap head are respectively fixedly sleeved at two ends of the spoke inner core, the carbon fiber prepreg layer 14 is arranged outside the spoke inner core, part of the metal tooth cap, and part of the cap head, the above part of the metal tooth cap refers to a connecting region for bonding the metal tooth cap to the carbon fiber prepreg layer, the part of the cap head refers to a connecting region for bonding the cap head to the carbon fiber prepreg layer, and the spoke inner core and the carbon fiber prepreg layer are integrally formed into a spoke body 1100. The carbon fiber prepreg layer 14 is formed by winding or wrapping the spoke inner core and the metal tooth cap and cap head with carbon fiber prepregs and heating in a mold. The carbon fiber core body 11 is cylindrical, and joint parts at two ends of the carbon fiber core body 11 are connected to the installation holes of the tooth cap and the cap head in a close-fit manner; and the joint parts of the carbon fiber core body 11 are connected to the tooth cap or the cap head via adhesives. A tooth cap anti-falling boss 120 and a cap head anti-falling boss 130 are arranged on the peripheries of the parts of the tooth cap and the cap head wrapped with the carbon fiber prepregs to increase a bonding force of the carbon fiber prepregs in wrapping. The anti-falling bosses may be annular bulges, may be of a toothed structure, or may be in other concave-convex shapes. The tooth cap and the cap head in the embodiment of the present disclosure may be made of other materials in addition to metal materials, to achieve the strength of connection with the rim or the hub.

Figure 16:
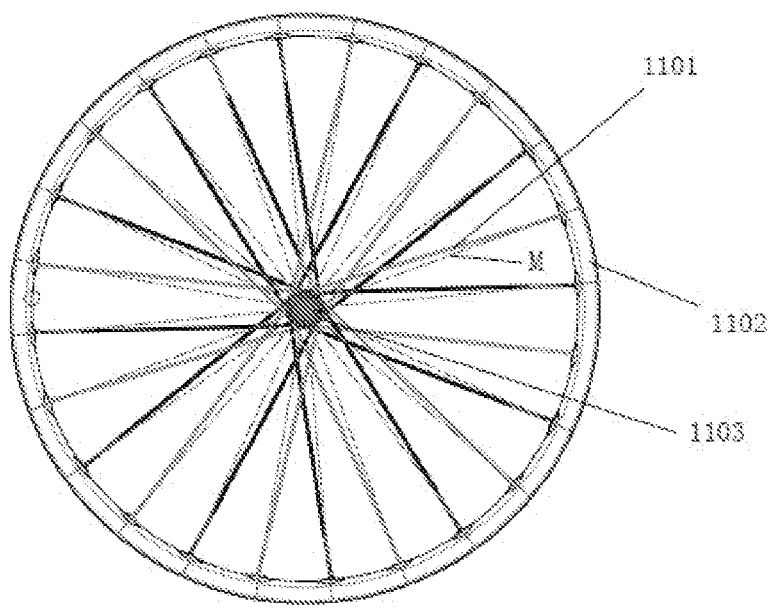
FIG. 16 is a diagram of cooperation between the spoke and a rim and between the spoke and a hub.

During use of the present disclosure, as shown in FIG. 16, an outer end of a spoke 1101 is connected to the rim 1102, an inner end of the spoke is connected to the hub 1103, and the spoke 1101 deviates from a radial connecting line M between a connecting point of the outer end of the spoke and the center of the hub.

Figure 3:
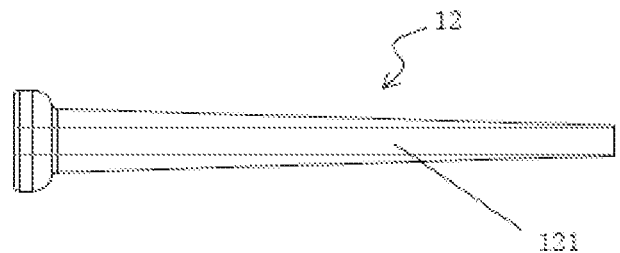
FIG. 3 is a schematic diagram of a cap head of a first metal part in the first embodiment of the present disclosure.
Figure 4:
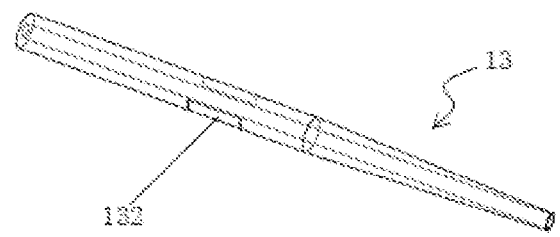
FIG. 4 is a three-dimensional view of a tooth cap of a second metal part in the first embodiment of the present disclosure.

As shown in FIG. 10, FIG. 8, FIG. 9, and FIG. 1, a method for manufacturing an integrally formed carbon fiber spoke in the present disclosure includes the following steps:

S1: manufacturing a carbon fiber core body 11, as shown in FIG. 2, where fibers in the carbon fiber core body are continuous at 0° and have a larger breaking tensile force, the carbon fiber core body is formed into a cylinder by means of mold forming, pultrusion, or other processes, and a diameter of the carbon fiber core body is smaller than 1.8 mm;

S2: manufacturing a first metal part 12, as shown in FIG. 3, and a second metal part 3, as shown in FIG. 4, FIG.

Figure 6:
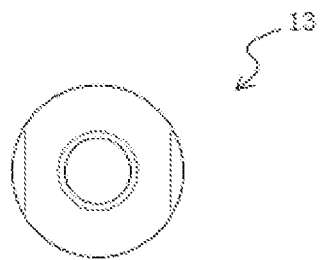
FIG. 6 is an axial view of the tooth cap of the second metal part in the first embodiment of the present disclosure.
Figure 7:
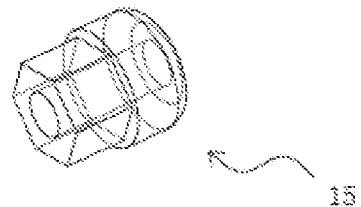
FIG. 7 is a schematic diagram of a nut in the first embodiment of the present disclosure.
Figure 10:
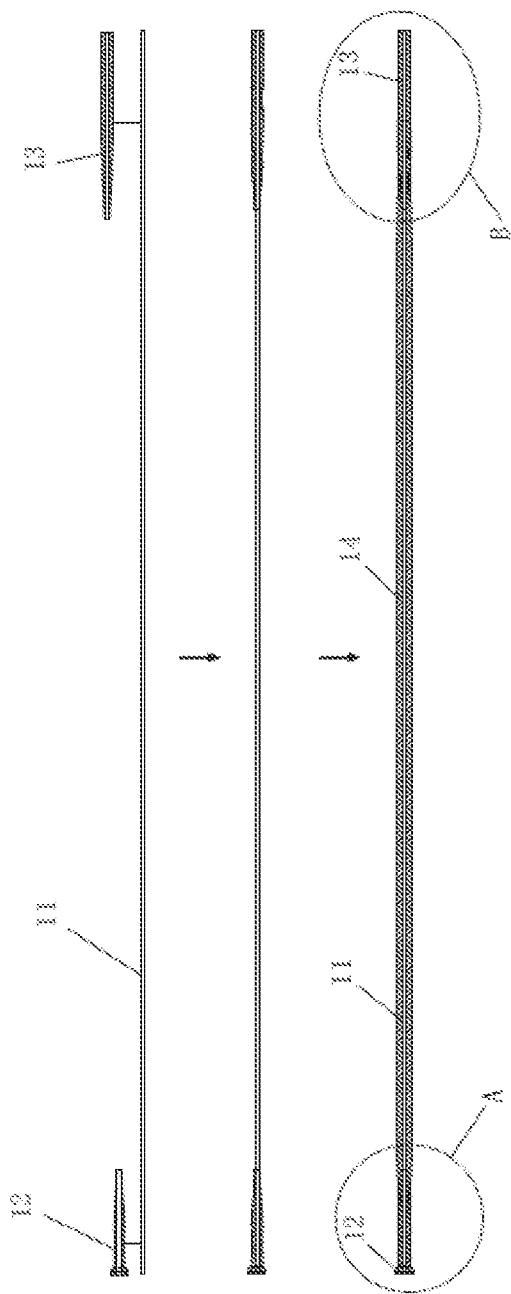
FIG. 10 is a flowchart of the first embodiment of the present disclosure in a sectional state.

5, and FIG. 6, at two ends of a spoke, and axially forming through holes in the centers of the two metal parts, where the through holes are matched with the carbon fiber core body, the first metal part 12 is a cap head cooperatively connected to a hub, the second metal part is a tooth cap, and the tooth cap is not provided with a screw tooth in this step, but the tooth cap may be provided with the screw tooth here;

S3: enabling the carbon fiber core body 11 to pass through the through holes of the first metal part 12 and the second metal part 13, and arranging the first metal part 12 and the second metal part 13 at two ends of the carbon fiber core body 11, where an outer end of the carbon fiber core body is flush with and fixed to hole openings of the through holes of the first metal part 12 and the second metal part 13, as shown in FIG. 8;

S4: winding or wrapping the carbon fiber core body and the metal parts at the two ends with carbon fiber prepregs to form a semi-finished product;

S5: putting the wound or wrapped semi-finished product into a forming mold for heat forming, where the carbon fiber prepregs after winding or wrapping form a spoke wrapping layer, i.e., the carbon fiber prepreg layer 14, as shown in FIG. 9; and S6: after forming, opening the mold to take out a formed product, carrying out refitting, and then processing a screw tooth on the second metal part 13 to obtain a final usable product.

In the above step S1 and step S2, the carbon fiber core body and the two metal parts may be manufactured simultaneously, or the metal parts are manufactured first, or the carbon fiber core body is manufactured first.

Figure 5:
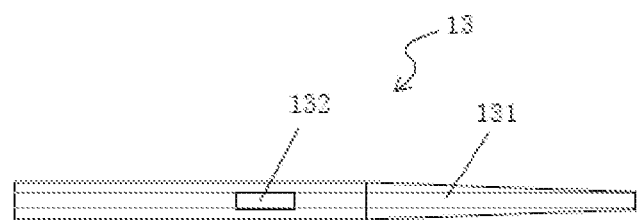
FIG. 5 is a side view of the tooth cap of the second metal part in the first embodiment of the present disclosure.
Figure 11:
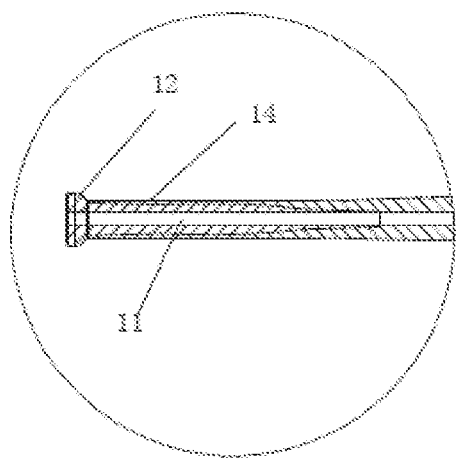
FIG. 11 is an enlarged view of A in FIG. 10.

For transition between bonding parts of the metal parts and the carbon fiber core body, as shown in FIG. 3, FIG. 4, and FIG. 5, in step S2, peripheral sides of opposite ends of the first metal part 12 and the second metal part 13 are tapered. The hole diameters of the through holes in the centers of the two metal parts are smaller than 1.8 mm A linear clamping groove 132 is formed in a side surface of the second metal part, such that a fixing effect may be achieved when a nut is tightened later, thereby preventing twist. As shown in FIG. 11, in step S2, anti-falling bosses are processed on the peripheral sides of the first metal part and the second metal part in design to increase a bonding force of the carbon fiber prepregs wrapping the metal parts. The anti-falling bosses may be annular bulges, may be of a toothed structure, or may be in other concave-convex shapes.

In an embodiment of the present disclosure, adhesion and carbon fiber prepreg wrapping are further used in cooperation to increase the bonding force. Before step S3, the two metal parts and the carbon fiber core body need to be subjected to roughening treatment. The roughening treatment here is mainly surface treatment, where the metal parts are sandblasted. A surface of a carbon rod, namely, the carbon fiber core body is coated with a high-strength and high-temperature-resistant adhesive, such that the carbon fiber core body is connected to the two metal parts for later use. The parts of the two ends of the carbon fiber core body bonded with the metal parts are mainly coated with the adhesive, or the whole carbon fiber core body is coated with the adhesive.

In an embodiment of the present disclosure, in step S4, winding or wrapping is performed by means of the cross-angle carbon fiber prepregs, and layer-by-layer winding starts from a position, with a slope, of the first metal part or the second metal part until a thickness required for design.

Here, the carbon fiber core body and the metal parts are wound/wrapped with 0° carbon fiber prepregs and angled carbon fiber prepregs, and fibers in the 0° carbon fiber prepregs axially extend along the spoke. An ordinary carbon spoke is generally formed from the 0° carbon fiber prepreg. Due to parallel arrangement of fibers, the strength of the spoke is reduced when there are defects or fractures after collision during use. In the embodiment of the present disclosure, an outer layer of a spoke body is formed from the cross-angle carbon fiber prepregs, such that the spoke has stronger twisting resistance and tensile force.

Figure 14:
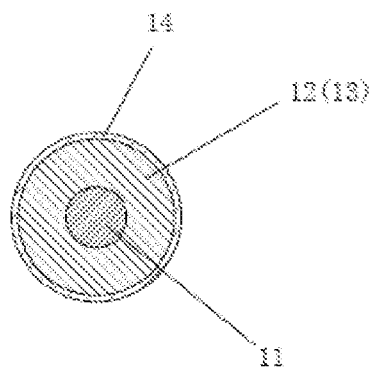
FIG. 14 is a sectional view of a spoke at one of metal parts in an embodiment of the present disclosure.
Figure 15:
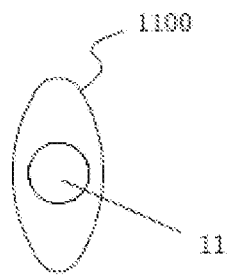
FIG. 15 is an outline drawing of a spoke body in an embodiment of the present disclosure.

In an embodiment of the present disclosure, in step S5, during heat forming, a temperature is controlled to range from 150° C. to 180° C., preferably 155° C., and a heating time is controlled to range from 50 min to 70 min, preferably 60 min. The parts of the two ends of the spoke matched with the metal parts are round, as shown in FIG. 14. The spoke between the metal parts at the two ends is round, flat, elliptical, or similarly rhombic section-shaped, as shown in FIG. 15. The spoke body is flat or roughly elliptical, to reduce wind resistance during riding. The minimum width of the spoke body 1100 is greater than the diameter of the carbon fiber core body 11 in the middle. In an embodiment of the present disclosure, in step S5, to improve the efficiency, during heat forming, the temperature is controlled to range from 150° C. to 180° C., preferably 155° C., and the heating time is controlled to range from 20 min to 30 min, preferably 25 min.

Figure 12:
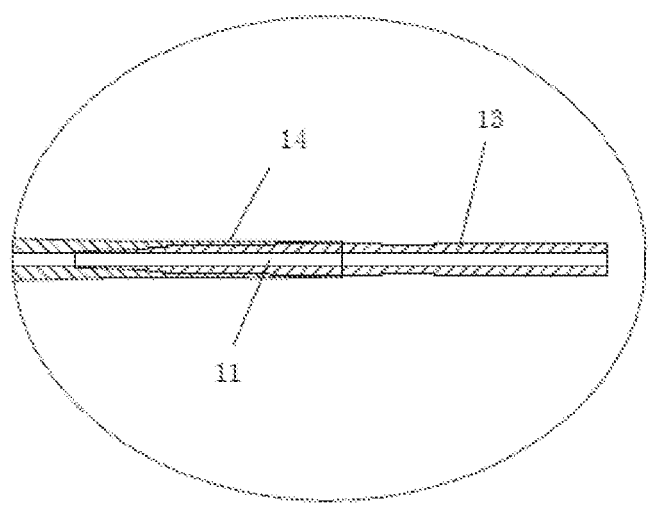
FIG. 12 is an enlarged view of B in FIG. 10.
Figure 13:
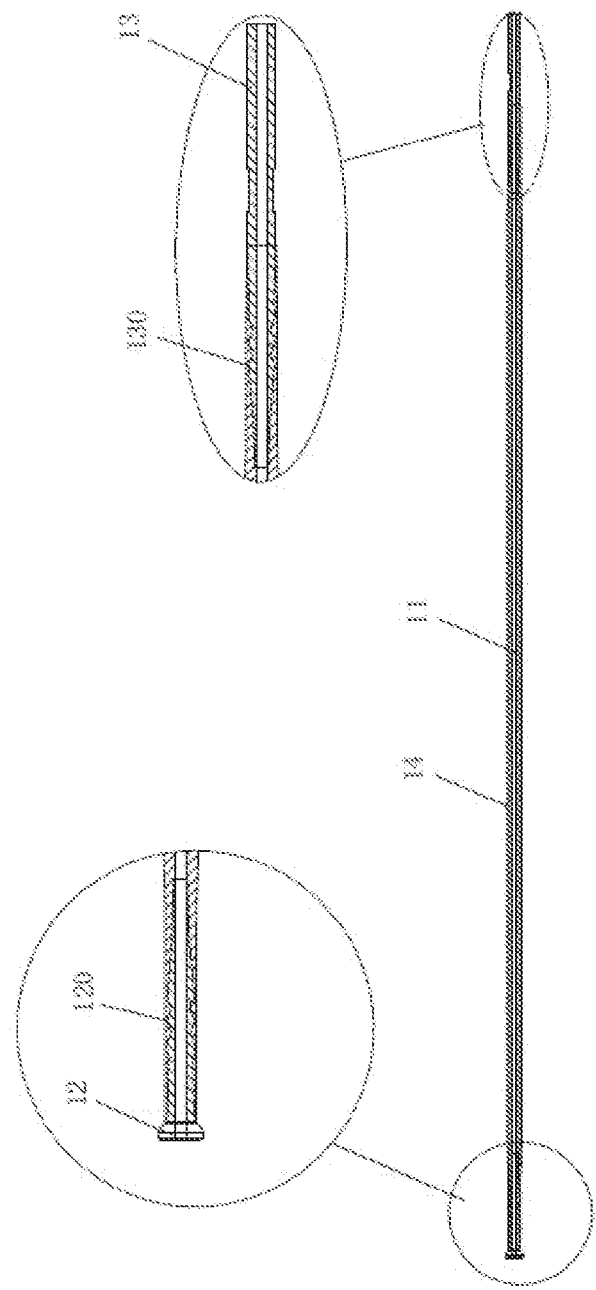
FIG. 13 is a sectional view after heat forming in another embodiment of the present disclosure.

As shown in FIG. 11, FIG. 12, and FIG. 14, sandwich structures are formed between the metal parts and carbon fiber materials. The metal parts refer to the first metal part 12 and the second metal part 13 at the two ends. The holes in the metal parts are provided with the carbon fiber core body 11, and the carbon fiber prepreg layer 14 is arranged outside.

In an embodiment of the present disclosure, as shown in FIG. 1, the nut 15 for matched assembly is arranged at an end of the screw tooth of the second metal part 13 on the spoke, such that the second metal part is connected to the rim.

The following table shows comparison between the carbon spoke in the embodiment of the present disclosure and a lightweight metal spoke in the current market:

| | Length (mm) | Weight without nut (g) | Maximum breaking force (kgf) | Maximum breaking deformation (mm) |
|---|---|---|---|---|
| High-end lightweight metal spoke | 279 | 4.5 | 298.33 | 6.52 |
| | 280 | 4.5 | 298.51 | 6.07 |
| | 280 | 4.5 | 302.50 | 6.38 |
| | avg. | 4.5 | 299.78 | 6.32 |
| Carbon spoke in the embodiment of the present disclosure | 279 | 3.0 | 390.24 | 4.25 |
| | 280 | 3.1 | 400.14 | 4.75 |
| | 280 | 3.1 | 421.27 | 5.46 |
| | 280 | 3.0 | 410.26 | 4.26 |
| | avg. | 3.05 | 405.48 | 4.68 |
| Difference comparison % | | −32.2% | 35.3% | −26.0% |
| Advantages of carbon spoke | 1. Weight reduced by about 30% (lighter weight) 2. Breaking strength increased by about 30% (higher breaking strength) 3. Maximum breaking deformation reduced by about 25% (smaller deformation) | | | |

The above data is obtained by a universal material testing machine through testing, and a testing standard refers to American Society For Testing And Materials D3039 (ASTM D3039).

The integrally formed carbon fiber spoke in the present disclosure has the following characteristics:
1. The integrally formed carbon fiber spoke does not need to be subjected to later yarn fixation, adhesion, and other processes.
2. The hole diameters of the holes in the centers of the metal parts, namely, the tooth cap and the cap head are smaller than 1.8 mm, and the diameter of a carbon fiber core is smaller than 1.8 mm
3. In the present disclosure, the first metal part and the second metal part, namely, the cap head and the tooth cap are small in size and may adapt to hubs and rims with small hole diameters on the current market. Compared with the way of direct bonding between the spoke body and the metal parts in the background, a frame for matched assembly is enhanced in strength due to small hole diameter.
4. The present disclosure overcomes the deficiencies of a carbon fiber spoke in the background, especially the bonding strength of adhesion, and changes the way of bonding between the spoke body and the metal parts at the two ends. By means of the process for winding or wrapping the carbon fiber core body (that is the spoke inner core) and the metal parts with the carbon fiber prepregs or further by cooperation between the adhesion and the carbon fiber prepreg wrapping, the sandwich structures are formed between the metal parts and the carbon fiber materials to expand bonding interfaces between the spoke body and the metal parts, namely, the tooth cap and the cap head at the two ends, thereby greatly increasing the bonding force between the spoke body and the metal parts at the two ends, ensuring that slip between the spoke body and the metal parts will not be caused, enhancing the structural strength of the product, and improving the safety of riding or races.

Figure 19:
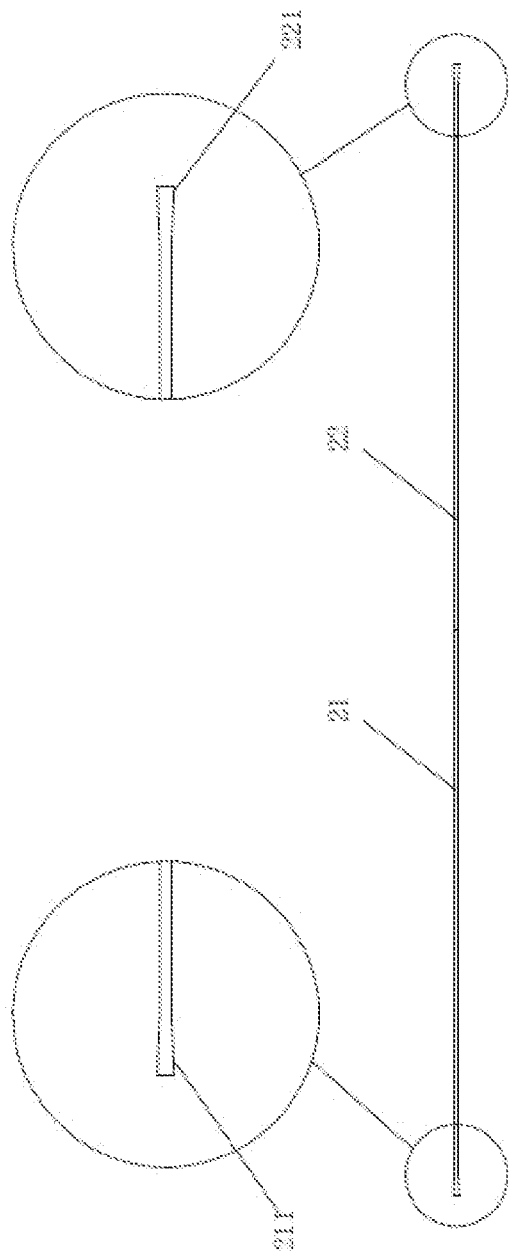
FIG. 19 is a schematic diagram of butt joint of carbon rod inner cores in the second embodiment of the present disclosure.

Embodiment 2: An integrally formed carbon fiber spoke includes a spoke inner core made from carbon fibers, a tooth cap (a second metal part 24) capable of being cooperatively connected to a rim (a bicycle rim), a cap head (a first metal part 23) capable of being cooperatively connected to a hub, and a carbon fiber prepreg layer 25, where the tooth cap and the cap head are provided with through installation holes, the installation hole of the tooth cap and the installation hole of the cap head are respectively fixedly sleeved at two ends of the spoke inner core, the carbon fiber prepreg layer is arranged outside the spoke inner core and part of the metal tooth cap and cap head, and the spoke inner core and the carbon fiber prepreg layer are integrally formed into a spoke body. The spoke inner core may be of a whole structure, that is to say, it is of an integrated structure from the cap head to the tooth cap. The spoke inner core may also be of a butt-joint structure, as shown in FIG. 19. The spoke inner core is formed by butting a first carbon rod inner core 21 and a second carbon rod inner core 22. The solution of the integrally formed spoke with the butted inner cores is described below.

Figure 20:
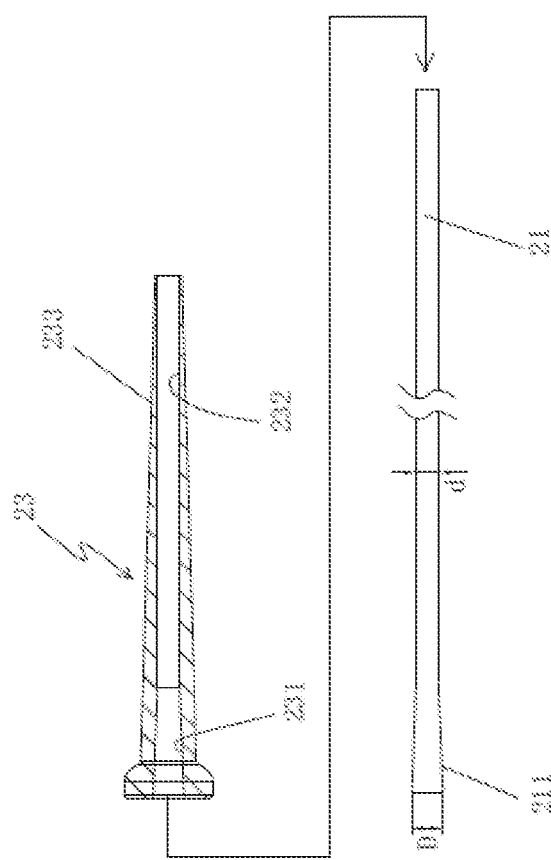
FIG. 20 is a directional diagram of assembly of a cap head of a first metal part and the carbon rod inner core in the second embodiment of the present disclosure.
Figure 21:
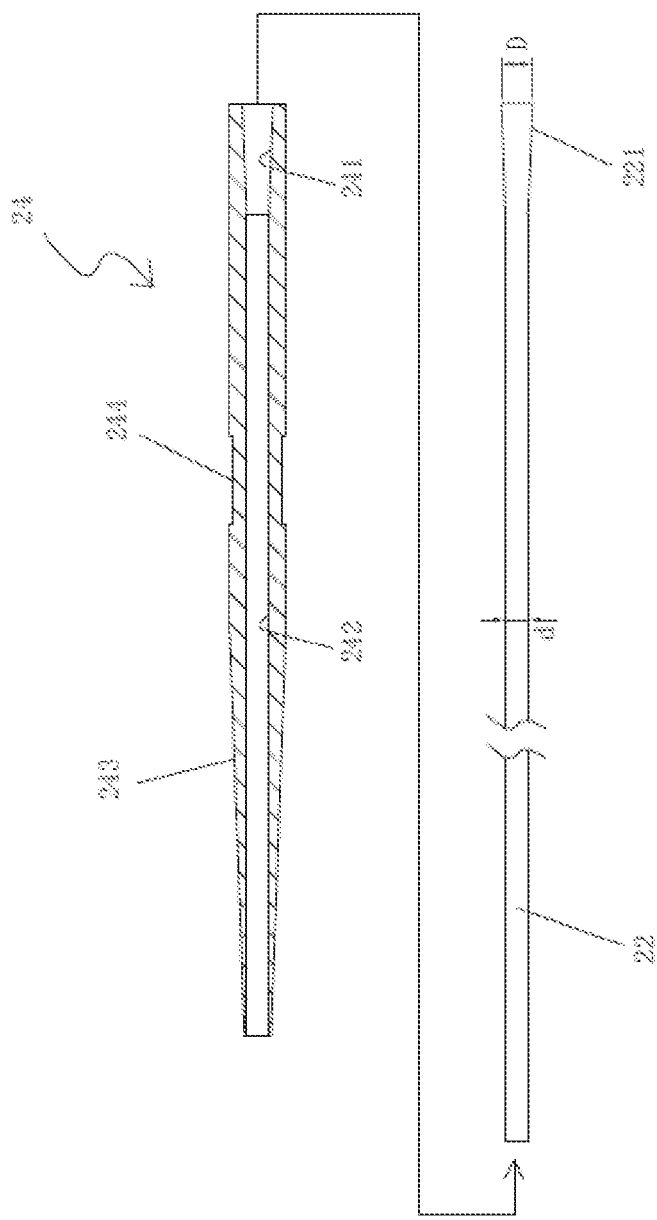
FIG. 21 is a directional diagram of assembly of a tooth cap of a second metal part and the carbon rod inner core in the second embodiment of the present disclosure.

Referring to FIG. 18 to FIG. 25, an integrally formed spoke with butted inner cores is disclosed, including a first carbon rod inner core 21, a second carbon rod inner core 22, and a carbon fiber prepreg layer 25, where the first carbon rod inner core 21 is butted with the second carbon rod inner core 22, outer ends of the first carbon rod inner core and the second carbon rod inner core are larger-diameter ends and are respectively sleeved with a cap head (a first metal part 23) and a tooth cap (a second metal part 24), the carbon fiber prepreg layer 25 is arranged outside the first carbon rod inner core 21, the second carbon rod inner core 22, the tooth cap, and the cap head, the cap head is provided with a head part cooperatively connected to a hub, the tooth cap is provided with a screw tooth cooperatively connected to a rim, and the head part of the cap head and the screw tooth of the tooth cap are positioned outside the carbon fiber prepreg layer. The outer ends of the first carbon rod inner core 21 and the second carbon rod inner core 22 are provided with inverted cone structures: as shown in FIG. 20, a maximum diameter D of the first carbon rod inner core, an outer diameter d of other parts of the first carbon rod inner core, and a minimum end outer diameter d of the first carbon rod inner core meets a condition that $2 \geq D/d \geq 1.3$; and as shown in FIG. 21, a maximum diameter D of the second carbon rod inner core, an outer diameter d of other parts of the second carbon rod inner core, and a minimum end outer diameter d of the second carbon rod inner core meets a condition that $2 \geq D/d \geq 1.3$. Correspondingly, an installation hole is formed in the center of the cap head, and the installation hole includes a tapered hole section 231 and a straight hole section 232, where a maximum inner diameter of the tapered hole section 231 is smaller than a maximum outer diameter of the inverted cone structure 211 of the first carbon rod inner core; and an installation hole is formed in the center of the tooth cap, and the installation hole includes a tapered hole section 241 and a straight hole section 242, where a maximum inner diameter of the tapered hole section 241 is smaller than a maximum outer diameter of the inverted cone structure 221 of the second carbon rod inner core. The carbon fiber prepreg layer 25 is formed by winding or wrapping the first carbon rod inner core 21, the second carbon rod inner core 22, the tooth cap, and the cap head with carbon fiber prepregs and heating in a mold. The cap head is provided with a conical extension part 233, and the tooth cap is provided with a conical extension part 243 for winding connection by the carbon fiber prepregs. Anti-falling bosses are arranged on the peripheries of the conical extension parts of the tooth cap and the cap head to increase a bonding force of the carbon fiber prepregs in wrapping. The anti-falling bosses may be annular bulges, may be of a toothed structure, or may be in other concave-convex shapes.

In the integrally formed spoke with the butted inner cores according to the present disclosure, the tooth cap and the cap head are nested into the corresponding carbon rod inner cores, are butted with each other, are wound or wrapped with the carbon fiber prepregs, and are put into a forming mold for heat curing and forming. The carbon rod inner cores and the carbon fiber prepreg layer form a spoke body. The tooth cap and the cap head are respectively fixed to the spoke body via double-layer connection, which ensures that slip between the spoke body and the metal parts will not be caused, and improves the structural strength of the product.

Figure 17:
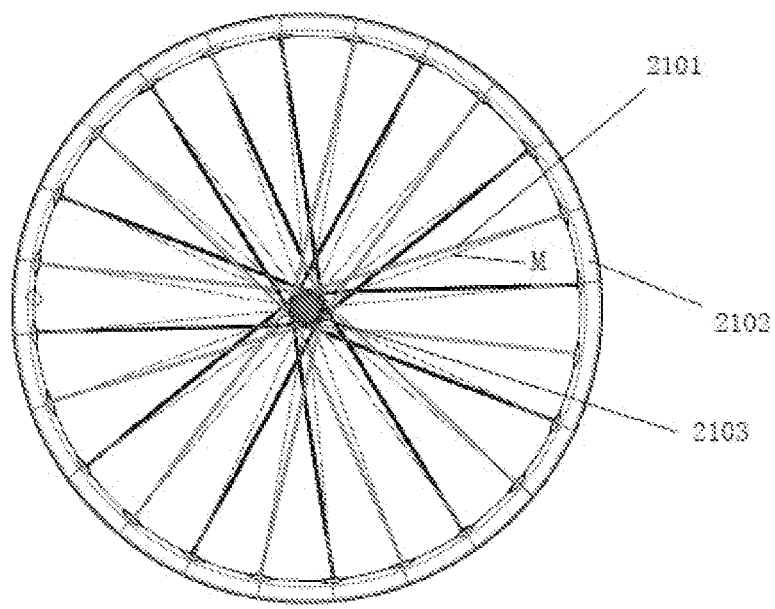
FIG. 17 is a schematic diagram of a spoke during use in a second embodiment of the present disclosure.
Figure 18:
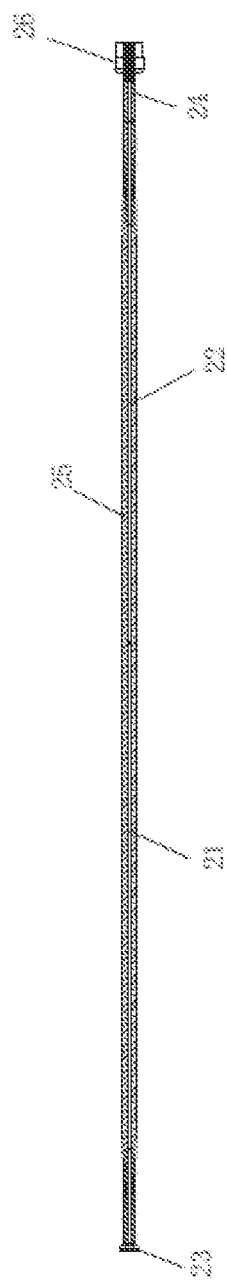
FIG. 18 is a sectional view of the second embodiment of the present disclosure.

During use of the present disclosure, as shown in FIG. 17, an outer end of a spoke 2101 is connected to a bicycle rim or the rim 2102, an inner end of the spoke is connected to the hub 2103, and the spoke 2101 deviates from a radial connecting line M between a connecting point of the outer end of the spoke and the center of the hub.

A method for manufacturing an integrally formed carbon fiber spoke with butted inner cores includes the following steps:
S1 manufacturing carbon rod inner cores, where
the carbon rod inner cores include a first carbon rod inner core 21 and a second carbon rod inner core 22, one ends of the two carbon rod inner cores are heads, the other ends of the two carbon rod inner cores are tails, the tails extend to the heads and are formed into cylinders, and the heads are formed into expanding parts with a gradually changed diameter, namely, inverted cone structures;

S2: manufacturing a first metal part 23 and a second metal part 24 at two ends of a spoke, and axially forming through holes in the centers of the two metal parts, the through holes being matched with the first carbon rod inner core and the second carbon rod inner core;

S3: enabling the first metal part 23 to be nested into the tail of the first carbon rod inner core 21 and moving the first metal part in place, enabling the second metal part 24 to be nested into the tail of the second carbon rod inner core 22 and moving the second metal part in place, and enabling the tail of the first carbon rod inner core 21 to be butted with the tail of the second carbon rod inner core 22, arranging the first metal part 23 on the head of the first carbon rod inner core, and arranging the second metal part 24 on the head of the second carbon rod inner core;

S4: winding or wrapping the first carbon rod inner core, the second carbon rod inner core, the first metal part, and the second metal part with carbon fiber prepregs to form a semi-finished product;

S5: putting the wound semi-finished product into a forming mold for heat forming, the carbon fiber prepregs forming an outer layer 5; and S6: after forming, opening the mold to take out a formed product, carrying out refitting, and then processing a screw tooth on the second metal part 24 to obtain a final usable product.

Figure 22:
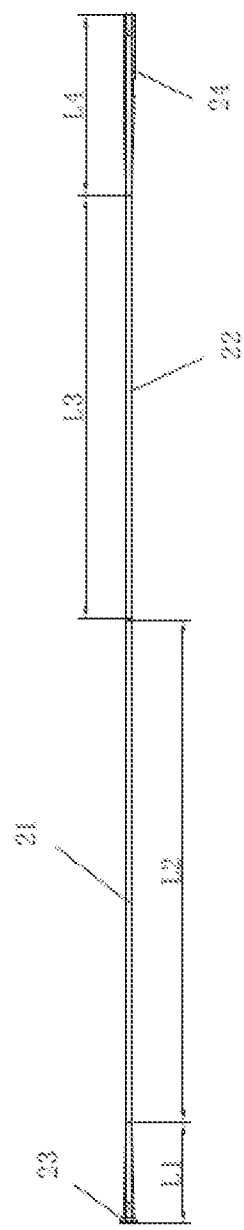
FIG. 22 is a diagram of butt joint of the carbon rod inner cores and the two metal parts after assembly in the second embodiment of the present disclosure.
Figure 23:
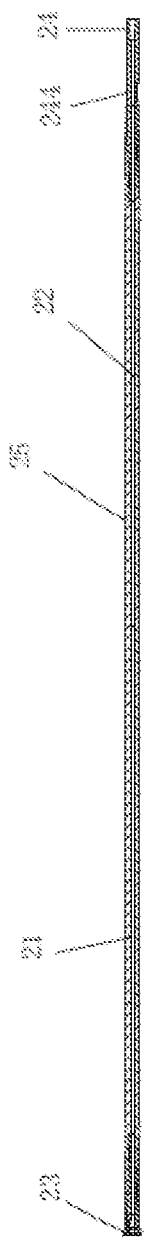
FIG. 23 is a sectional view after forming in the second embodiment of the present disclosure.
Figure 24:
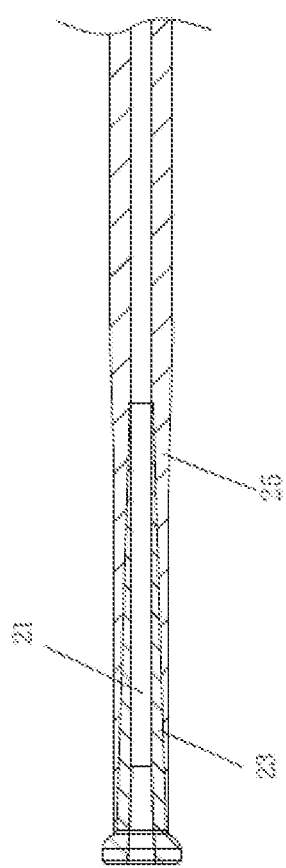
FIG. 24 is a local sectional view of the cap head of the first metal part after forming in the second embodiment of the present disclosure.
Figure 25:
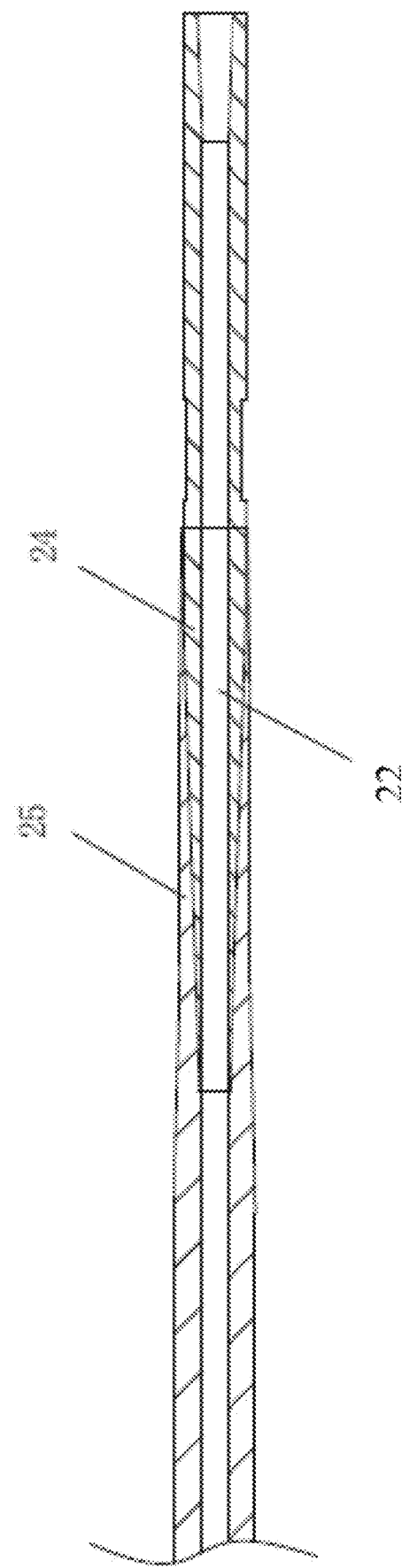
FIG. 25 is a local sectional view of the tooth cap of the second metal part after forming in the second embodiment of the present disclosure.

In the embodiment of the present disclosure, the first carbon rod inner core 21 and the second carbon rod inner core 22 may be individuals with different lengths, as shown in FIG. 22. A length L1 of the first metal part 23, a length L2 of the first carbon rod inner core after removal of the first metal part, a length L4 of the second metal part 24, and a length L3 of the second carbon rod inner core after removal of the second metal part meets a condition that L2>2L1, and L3>2L4. To improve the efficiency, the first carbon rod inner core 21 and the second carbon rod inner core 22 may be designed to be carbon rod inner cores of a same specification for unified management. The same specification includes the length, the outer diameter and the like. The length is half of the whole spoke, which facilitates subsequent assembly with the metal parts. The carbon rod inner cores adopt carbon fiber rod bodies formed by means of molding or pultrusion. A diameter of the cylinders of the carbon rod inner cores is smaller than 1.8 mm.

For transition between bonding parts of the metal parts and the carbon fiber core body, in step S2, peripheral sides of the first metal part 23 and the second metal part 24 are tapered. The through holes in the centers of the two metal parts include tapered sections and straight sections respectively matched with the inverted cone structures and the cylinders of the carbon rod inner cores. In step S2, concave-convex designs are processed on the peripheral sides of the first metal part 23 and the second metal part 24 to increase a bonding force of the carbon fiber prepregs wrapping the metal parts. A linear clamping groove 244 is formed in an outer side of the concave-convex design of the second metal part 24, such that a fixing effect may be achieved when a nut 26 is tightened later, thereby preventing twist.

In an embodiment of the present disclosure, adhesion and carbon fiber prepreg wrapping are further used in cooperation to increase the bonding force. Before step S3, the two metal parts and the carbon rod inner cores need to be subjected to roughening treatment. The roughening treatment here is mainly surface treatment, where the metal parts are sandblasted. The surfaces of the carbon rod inner cores are coated with a high-strength and high-temperature-resistant adhesive, such that the carbon rod inner cores are connected to the two metal parts. The parts of the two ends of the carbon fiber core body bonded with the metal parts are mainly coated with the adhesive, or the whole carbon rod is coated with the adhesive.

In an embodiment of the present disclosure, in step S4, winding or wrapping is performed by means of the cross-angle carbon fiber prepregs, and layer-by-layer winding starts from a position, with a slope, of the first metal part or the second metal part until a thickness required for design. Here, a carbon fiber core and the metal parts are wound/wrapped with 0° carbon fiber prepregs or angled carbon fiber prepregs.

In an embodiment of the present disclosure, in step S5, during heat forming, a temperature is controlled to range from 150° C. to 180° C., preferably 155° C., and a heating time is controlled to range from 50 min to 70 min, preferably 60 min; and the spoke is round, flat, elliptical, or similarly rhombic section-shaped. In a preferred embodiment of the present disclosure, in step S5, to improve the efficiency, during heat forming, the temperature is controlled to range from 150° C. to 180° C., preferably 155° C., and the heating time is controlled to range from 20 min to 30 min, preferably 25 min.

In an embodiment of the present disclosure, the first metal part 23 is referred to as the cap head, and the second metal part 24 is referred to as the tooth cap; a nut 26 for matched assembly is arranged at an end of the screw tooth of the second metal part on the spoke, such that the second metal part is connected to a bicycle rim; and the first metal part of the spoke has a cap head structure to be connected and fixed to a hub.

Difference comparison between the carbon spoke in the embodiment of the present disclosure and a current metal spoke:

|  | Length (mm) | Weight without nut (g) | Maximum breaking force (kgf) | Maximum breaking deformation (mm) |
| --- | --- | --- | --- | --- |
| High-end lightweight metal spoke | 279 | 4.5 | 299.31 | 6.42 |
|  | 280 | 4.5 | 302.50 | 6.17 |
|  | 280 | 4.5 | 316.40 | 6.45 |
|  | avg. | 4.5 | 306.07 | 6.35 |
| Carbon spoke in the embodiment of the present disclosure | 279 | 3.1 | 386.20 | 4.65 |
|  | 280 | 3.2 | 402.24 | 4.85 |
|  | 280 | 3.2 | 410.35 | 5.36 |
|  | avg. | 3.17 | 399.60 | 4.95 |
| Difference comparison % |  | −29.6% | 30.6% | −22.0% |
| Advantages of carbon spoke | 1. Weight reduced by about 30% (lighter weight) 2. Breaking strength increased by about 30% (higher breaking strength) 3. Maximum breaking deformation reduced by about 20% (smaller deformation) | | | |

The above data is obtained by a universal material testing machine through testing.

The integrally formed carbon fiber spoke in the present disclosure has the following characteristics:
1. In the method for manufacturing the integrally formed spoke with the butted inner cores, later yarn fixation, adhesion, and other processes are not needed.
2. The hole diameters of smaller parts of the holes in the centers of the metal parts, namely, the tooth cap and the cap head are smaller than 1.8 mm, and the diameter of the cylinders of a carbon rod is smaller than 1.8 mm. The two metal parts respectively penetrate into a smaller end of the carbon rod, and the metal parts are more firmly bonded at a larger end of the carbon rod under the action of a tension.

3 In the present disclosure, the first metal part and the second metal part, namely, the cap head and the tooth cap are small in size and may adapt to hubs and bicycle rims with small hole diameters on the current market. A frame for matched assembly is enhanced in strength due to small hole diameter.

4. The present disclosure overcomes the deficiency of low bonding strength of the carbon fiber spoke during adhesion, changes the way of bonding between the spoke body and the metal parts at the two ends, and adopts double-layer connection or even three-layer connection. Specifically, by means of the process for wrapping the carbon rod and the metal parts with the carbon fiber prepregs or further by cooperation between the adhesion and the carbon fiber prepreg wrapping, sandwich structures are formed between the metal parts and carbon fiber materials to expand bonding interfaces between the spoke body and the metal parts, namely, the tooth cap and the cap head at the two ends, thereby greatly increasing the bonding force between the spoke body and the metal parts at the two ends; and meanwhile, the spoke inner core is bonded with the metal parts via the inverted cone structures, which ensures that slip between the spoke body and the metal parts will not be caused, enhances the structural strength of the product, and improves the safety of riding or races.

The above records are only the embodiments using the technical content of the present disclosure. Any modifications or changes made by those skilled in the art by using the present disclosure fall within the scope of patent of the present disclosure, and are not limited to those revealed by the embodiments.

The invention claimed is:

1. An integrally formed carbon fiber spoke, comprising a spoke inner core made from carbon fibers, a tooth cap configured to be cooperatively connected to a rim, a cap head configured to be cooperatively connected to a hub, and a carbon fiber prepreg layer, wherein:
    the tooth cap and the cap head each is provided with an installation hole, the installation hole of the tooth cap and the installation hole of the cap head are respectively fixedly sleeved at two ends of the spoke inner core, the carbon fiber prepreg layer is arranged radially outside the spoke inner core, part of the tooth cap and part of the cap head,
    the spoke inner core and the carbon fiber prepreg layer are integrally formed into a spoke body,
    the spoke inner core comprises a first carbon rod inner core and a second carbon rod inner core,
    the first carbon rod inner core is butted with the second carbon rod inner core, and
    an outer end of the first carbon rod inner core and an outer end of the second carbon rod inner core are respectively sleeved with the cap head and the tooth cap.

2. The integrally formed carbon fiber spoke according to claim 1, wherein:
    the spoke inner core is cylindrical,
    joint parts at the two ends of the spoke inner core are connected to the installation holes of the tooth cap and the cap head in a close-fit manner, and
    the joint parts of the spoke inner core are connected to the tooth cap or the cap head via adhesives.

3. The integrally formed carbon fiber spoke according to claim 1, wherein:
    anti-falling bosses are arranged on peripheries of the part of the tooth cap and the part of the cap head wrapped with carbon fiber prepregs of the carbon fiber prepreg layer,
    a thread is formed in an end of the tooth cap,
    the tooth cap is provided with a nut for matched assembly to be connected and fixed to the rim, and
    a linear clamping groove is formed in a peripheral side of the tooth cap.

4. A method for manufacturing an integrally formed carbon fiber spoke, the method being configured for manufacturing the integrally formed carbon fiber spoke according to claim 1, wherein the method comprises the following steps:
    S1: manufacturing a carbon fiber core body;
    S2: manufacturing a first metal part and a second metal part at two ends of a spoke, and axially forming through holes in centers of the first metal part and the second metal part, the through holes being matched with the carbon fiber core body;
    S3: enabling the carbon fiber core body to pass through the through holes of the first metal part and the second metal part, and arranging the first metal part and the second metal part at two ends of the carbon fiber core body;
    S4: winding or wrapping the carbon fiber core body and the first metal part and the second metal part at the two ends of the carbon fiber core body with carbon fiber prepregs to form a semi-finished product;
    S5: putting the semi-finished product into a forming mold for heat forming; and
    S6: after forming, opening the forming mold to take out a formed product, and then processing a screw tooth on the second metal part to obtain a final usable product, wherein:
    before step S3, the first metal part, the second metal part, and the carbon fiber core body are roughened, and a surface of the carbon fiber core body is coated with an adhesive, such that the carbon fiber core body is connected to the first metal part and the second metal part,
    in step S4, the winding or wrapping is performed using the carbon fiber prepregs provided at a cross angle, and layer-by-layer winding starts from a position, with a slope, of the first metal part or the second metal part until a predetermined thickness is obtained,
    in step S5, during the heat forming, a temperature is controlled to range from 150° C. to 180° C., and a time ranges from 50 min to 70 min,
    in step S5, the spoke is round, flat, elliptical, or rhombic section-shaped, and
    in step S6, a nut for matched assembly is arranged at an end of the screw tooth of the second metal part on the spoke.

5. The method for manufacturing the integrally formed carbon fiber spoke according to claim 4, wherein:
    in step S1, fibers in the carbon fiber core body are continuous at 0°,
    in step S1, the carbon fiber core body is formed into a cylinder by means of molding or pultrusion, and a diameter of the carbon fiber core body is smaller than 1.8 mm, in step S2, peripheries of opposite ends of the first metal part and the second metal part are tapered, hole diameters of the through holes in the centers of the first metal part and the second metal part are smaller than 1.8 mm, and a linear clamping groove is formed in a side surface of the second metal part, and in step S2, anti-falling bosses are processed on peripheral sides of the first metal part and the second metal part to increase a bonding force of the carbon fiber prepregs wrapping the first metal part and the second metal part.

6. The method for manufacturing the integrally formed carbon fiber spoke according to claim 4, wherein in step S5, during the heat forming, a temperature is controlled to range from 150° C. to 180° C., and a time ranges from 20 min to 30 min.

7. The integrally formed carbon fiber spoke according to claim 1, wherein;
the carbon fiber prepreg layer is formed by winding the first carbon rod inner core, the second carbon rod inner core, the tooth cap, and the cap head with carbon fiber prepregs and heating in a mold,
the outer ends of the first carbon rod inner core and the second carbon rod inner core are of an inverted cone structure, and
a maximum end diameter D of the first carbon rod inner core and the second carbon rod inner core and a minimum end diameter d of the first carbon rod inner core and the second carbon rod inner core meet a condition that 2≥D/d≥1.3.

8. The integrally formed carbon fiber spoke according to claim 1, wherein;
the installation hole of the cap head is formed in a center of the cap head,
the installation hole of the cap head comprises a tapered hole section and a straight hole section,
a maximum inner diameter of the tapered hole section is smaller than a maximum outer diameter of an inverted cone structure of the first carbon rod inner core,
the installation hole of the tooth cap is formed in a center of the tooth cap,
second installation hole of the tooth cap comprises a second tapered hole section and a second straight hole section, and
a maximum inner diameter of the second tapered hole section is smaller than a maximum outer diameter of an inverted cone structure of the second carbon rod inner core.

9. A method for manufacturing an integrally formed carbon fiber spoke with butted inner cores, the method being configured for manufacturing the integrally formed carbon fiber spoke according to claim 1, wherein the method comprises the following steps:
S1: manufacturing carbon rod inner cores, wherein:
the carbon rod inner cores comprise the first carbon rod inner core and the second carbon rod inner core,
one end of the first carbon rod inner core and the second carbon rod inner core are heads,
a second end of the first carbon rod inner core and the second carbon rod inner core are tails,
the tails extend to the heads and are formed into cylinders, and
the heads are formed into expanding parts with a gradually changed diameter;
S2: manufacturing a first metal part and a second metal part at two ends of a spoke, and axially forming through holes in centers of the first metal part and the second metal part, the through holes being matched with the first carbon rod inner core and the second carbon rod inner core;
S3: enabling the first metal part to be nested into the tail of the first carbon rod inner core and moving the first metal part in place,
enabling the second metal part to be nested into the tail of the second carbon rod inner core and moving the second metal part in place, and
enabling the tail of the first carbon rod inner core to be butted with the tail of the second carbon rod inner core, arranging the first metal part on the head of the first carbon rod inner core, and arranging the second metal part on the head of the second carbon rod inner core;
S4: winding or wrapping the first carbon rod inner core, the second carbon rod inner core, the first metal part, and the second metal part with carbon fiber prepregs to form a semi-finished product;
S5: putting the semi-finished product into a forming mold for heat forming; and
S6: after forming, opening the forming mold to take out a formed product, and then processing a screw tooth on the second metal part to obtain a final usable product.

10. The method for manufacturing the integrally formed carbon fiber spoke according to claim 9, wherein:
in step S1, the first carbon rod inner core and the second carbon rod inner core are carbon rod inner cores of a same specification, a carbon fiber rod body is formed by means of molding or pultrusion, and a diameter of the cylinders of the first carbon rod inner core and the second carbon rod inner core is smaller than 1.8 mm;
in step S2, peripheries of opposite ends of the first metal part and the second metal part are tapered, and the through holes in the centers of the first metal part and the second metal part comprise tapered sections to match with the expanding parts of the corresponding first carbon rod inner core and second carbon rod inner; and
in step S2, concave-convex designs are processed on peripheral sides of the first metal part and the second metal part to increase a bonding force of the carbon fiber prepregs wrapping the first metal part and the second metal part, and a linear clamping groove is formed in an outer side of the concave-convex design of the second metal part.

11. The method for manufacturing the integrally formed carbon fiber spoke according to claim 9, wherein:
before step S3, the first metal part and the second metal part and the corresponding first carbon rod inner core and second carbon rod inner core are roughened, and surfaces of the heads of the first carbon rod inner core and the second carbon rod inner core are coated with an adhesive, such that the first carbon rod inner core and the second carbon rod inner core are connected and adhered to the corresponding first metal part and second metal part; and
in step S4, the winding or wrapping is performed by means of the carbon fiber prepregs provided at a cross angle, and layer-by-layer winding starts from a position, with a slope, of the first metal part or the second metal part until a predetermined thickness is obtained.

12. The method for manufacturing the integrally formed carbon fiber spoke according to claim 9, wherein in step S5, during the heat forming, a temperature is controlled to range from 150° C. to 180° C., and a time ranges from 20 min to 30 min.

* * * * *